(12) United States Patent
Fan et al.

(10) Patent No.: US 10,334,668 B2
(45) Date of Patent: Jun. 25, 2019

(54) LED DRIVER ADAPTED TO ELECTRONIC TRANSFORMER

(71) Applicant: Silergy Semiconductor Technology (Hangzhou) LTD, Hangzhou, ZheJiang Province (CN)

(72) Inventors: Fenghong Fan, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 138 days.

(21) Appl. No.: 15/292,870

(22) Filed: Oct. 13, 2016

(65) Prior Publication Data

US 2017/0034884 A1    Feb. 2, 2017

Related U.S. Application Data

(63) Continuation of application No. 13/890,145, filed on May 8, 2013, now Pat. No. 9,491,818.

(30) Foreign Application Priority Data

May 28, 2012    (CN) .......................... 2012 1 0173730

(51) Int. Cl.
H05B 33/08    (2006.01)

(52) U.S. Cl.
CPC ..... H05B 33/0815 (2013.01); H05B 33/0845 (2013.01); H05B 33/0887 (2013.01); Y02B 20/347 (2013.01)

(58) Field of Classification Search
CPC . H05B 33/0815; H05B 33/0884; H05B 37/02
See application file for complete search history.

(56) References Cited

U.S. PATENT DOCUMENTS

| 8,169,160 | B2 | 5/2012 | Yan et al. |
| 8,643,289 | B2 | 2/2014 | Ryu et al. |
| 8,742,674 | B2 | 6/2014 | Shteynberg et al. |
| 2009/0273290 | A1 | 11/2009 | Ziegenfuss |
| 2013/0163300 | A1 | 6/2013 | Zhao |

FOREIGN PATENT DOCUMENTS

CN    102014559 A    4/2011

Primary Examiner — Lincoln D Donovan
Assistant Examiner — Colleen J O Toole
(74) Attorney, Agent, or Firm — Michael C. Stephens, Jr.

(57) ABSTRACT

Disclosed is an LED driver adapted to an electronic transformer, where the LED driver can ensure that the electronic transformer meets minimum load current requirements, and operates during an entire AC period by clamping the minimum inductor current. By controlling the LED load current through a current stabilization control circuit, the LED load can operate with relatively high control accuracy and fast response speed. In addition, the LED driver can match various electronic transformers based on traditional circuit structures, and the LED load can operate without flicking.

14 Claims, 4 Drawing Sheets

LED DRIVER ADAPTED TO ELECTRONIC TRANSFORMER

RELATED APPLICATIONS

This application is a continuation of the following application, U.S. patent application Ser. No. 13/890,145, filed on May 8, 2013, and which is hereby incorporated by reference as if it is set forth in full in this specification, and which also claims the benefit of Chinese Patent Application No. 201210173730.2, filed on May 28, 2012, which is incorporated herein by reference in its entirety.

FIELD OF THE INVENTION

The present invention relates to the field of power supplies, and more specifically to an LED driver adapted to an electronic transformer.

BACKGROUND

Spotlights (e.g., MR16 lamps) are extensively used in many lighting applications today. Usually, spotlights can include two parts: an electronic transformer; and a high power consumption quartz lamp. With increasing light-emitting diode (LED) applications in the lighting field, it has become an irreversible trend of replacing traditional quartz lights with LED lights. However, because the output of an electronic transformer in a traditional lighting circuit (e.g., for quartz lights) is typically a high-frequency low-voltage AC power supply, while LED lamps require a constant DC current source, a mismatch problem can occur between an input power supply and a load. Therefore, an effective LED driver may be needed for converting the high-frequency low-voltage AC power supply to a constant DC current source for LED applications.

SUMMARY

In one embodiment, a light-emitting diode (LED) driver adapted to an electronic transformer, can include: (i) a rectifier bridge and a power stage circuit coupled between the electronic transformer and an LED load, where the power stage circuit comprises an inductor and a power switch; (ii) a first control circuit configured to control the power switch to regulate a current of the inductor and to maintain an output voltage of the power stage circuit as substantially constant based on a first sense signal and a first voltage feedback signal, where the first sense signal represents the inductor current, and where the first voltage feedback signal represents the output voltage of the power stage circuit; (iii) an inductor current clamping circuit in the first control circuit, where the inductor current clamping circuit comprises a clamping voltage that matches a holding current of the electronic transformer, where the inductor current clamping circuit is configured to clamp the inductor current to the holding current when the inductor current is less than the holding current; and (iv) a current stabilizing control circuit configured to detect a current of the LED load to generate a detection signal, and to maintain the LED load current as substantially constant based on the detection signal.

Embodiments of the present invention can advantageously provide several advantages over conventional approaches. For example, particular embodiments can provide an LED driver adapted to an electronic transformer. The LED driver can ensure that the electronic transformer meets minimum load current requirements, and functions during an entire AC period by clamping the minimum inductor current. In this way, the LED driver can achieve a relatively high utilization rate, without causing LED light flicker. Also, a relatively large electrolytic capacitor may not be required after a rectifier bridge, so as to avoid possible damages caused by impulse current. Other advantages of the present invention may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
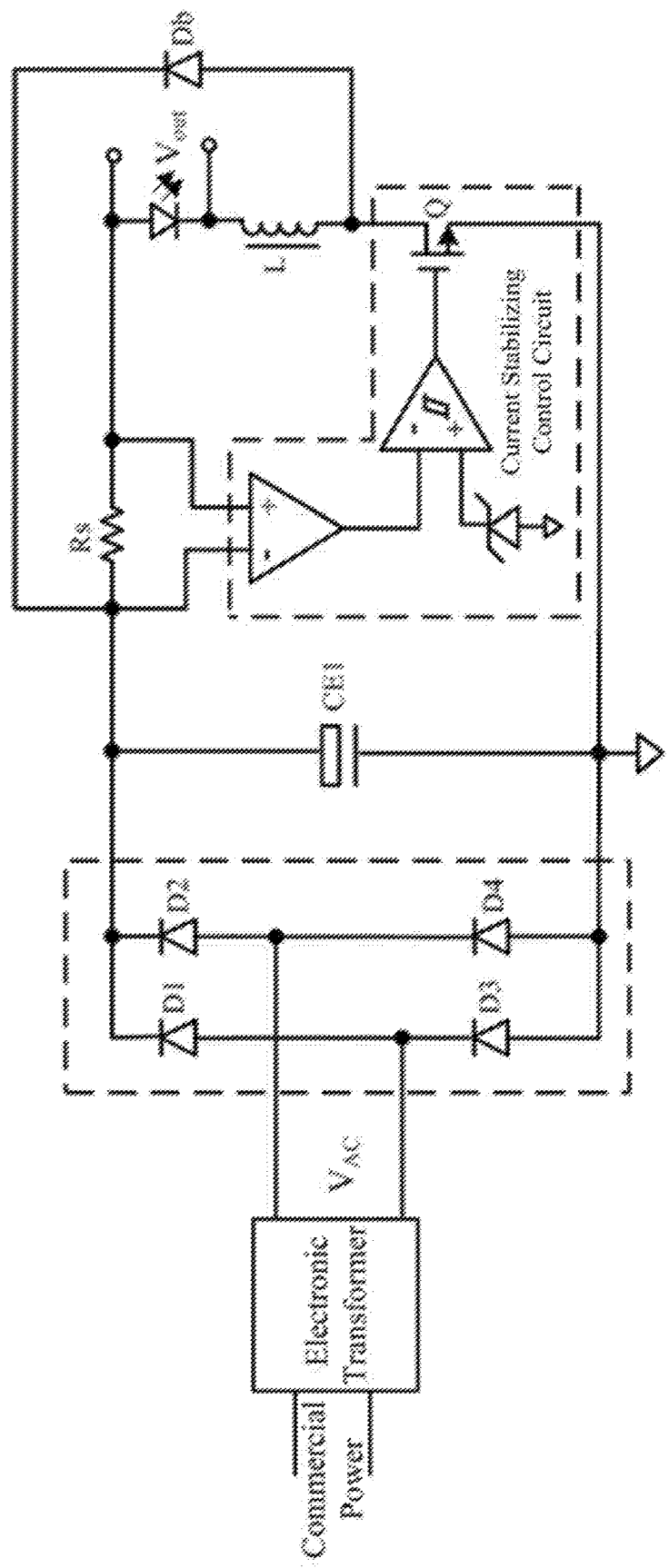
FIG. 1 shows a schematic diagram of an example LED driver.

A schematic diagram of an example light-emitting diode (LED) driver is shown in FIG. 1. A low-voltage AC power supply generated through an electronic transformer can be rectified by a rectifier bridge, and then filtered by electrolytic capacitor CE1, to finally supply a constant operating current for an LED by a current stabilizing control circuit. However, a relatively large electrolytic capacitor CE1 (e.g., hundreds of μF) may be placed after the rectifier bridge in the example of FIG. 1. The existence of this electrolytic capacitor may turn the original resistive load to a relatively large capacitive load for the electronic transformer, and a relatively large impulse current may be generated at the output current of the electronic transformer. As a result, the impulse current may not only affect normal operation of the electronic transformer, but can also increase circuit conduction loss, circuit temperature, and may reduce the operating lifetime.

In addition, a capacitive load of several hundred μF may cause the electronic transformer to operate in an intermittent state to reduce the utilization rate of the electronic transformer. Further, ripples on the electrolytic capacitor may increase to add a relatively large power frequency ripple on the LED current, which can lead to flicker of the LED lamp load. Therefore, matching the electronic transformer with various loads is an urgent problem in LED driver design. Because the electronic transformer is typically designed for resistive loads, a minimum load current should be maintained during the entire AC period in order to keep the transformer working normally. If the load current drops to lower than the minimum load current, or a large load current transient makes the load current lower than the minimum load current, the electronic transformer may turn off during the AC period to cause LED lamp flicking.

Therefore, particular embodiments are directed to a well-adapted LED driver for an electronic transformer to eliminate impulse current without utilizing a relatively large electrolytic capacitor after a rectifier bridge, and to ensure the electronic transformer operates under various types of loads without causing lamp flicking. For example, particular embodiments can provide an LED driver adapted to an electronic transformer. The LED driver can ensure the electronic transformer meets minimum load current requirements, and operates normally during an entire AC period by clamping the minimum inductor current. In this way, the LED driver can achieve a relatively high utilization rate, without causing LED light flicker. Also, a relatively large electrolytic capacitor may not be needed after a rectifier bridge, which can avoid possible damages caused by impulse current.

An LED driver adapted to an electronic transformer in particular embodiments can enable the electronic transformer to operate normally under substantially any circumstance by controlling the inductor current through a control circuit and an inductor current clamping circuit, so as to achieve a high utilization ratio and two eliminate LED light flicker. Also, a DC voltage source with a relatively small ripple can be generated for a current stabilizing controlling circuit, and the LED load current can be controlled by the current stabilizing control circuit to ensure lighting stability of the LED load. In addition, the LED driver can take advantage of relatively high accuracy and improved response speed, and can match with any suitable electronic transformer under different load conditions to ensure the electronic transformer operates normally. The LED driver in particular embodiments can also save the relatively large electrolytic capacitor after the rectifier bridge to avoid a large impulse current from being added to the output current of the electronic transformer, to achieve a higher reliability.

In one embodiment, a light-emitting diode (LED) driver adapted to an electronic transformer, can include: (i) a rectifier bridge and a power stage circuit coupled between the electronic transformer and an LED load, where the power stage circuit comprises an inductor and a power switch; (ii) a first control circuit configured to control the power switch to regulate a current of the inductor and to maintain an output voltage of the power stage circuit as substantially constant based on a first sense signal and a first voltage feedback signal, where the first sense signal represents the inductor current, and where the first voltage feedback signal represents the output voltage of the power stage circuit; (iii) an inductor current clamping circuit in the first control circuit, where the inductor current clamping circuit comprises a clamping voltage that matches a holding current of the electronic transformer, where the inductor current clamping circuit is configured to clamp the inductor current to the holding current when the inductor current is less than the holding current; and (iv) a current stabilizing control circuit configured to detect a current of the LED load to generate a detection signal, and to maintain the LED load current as substantially constant based on the detection signal.

Figure 2:
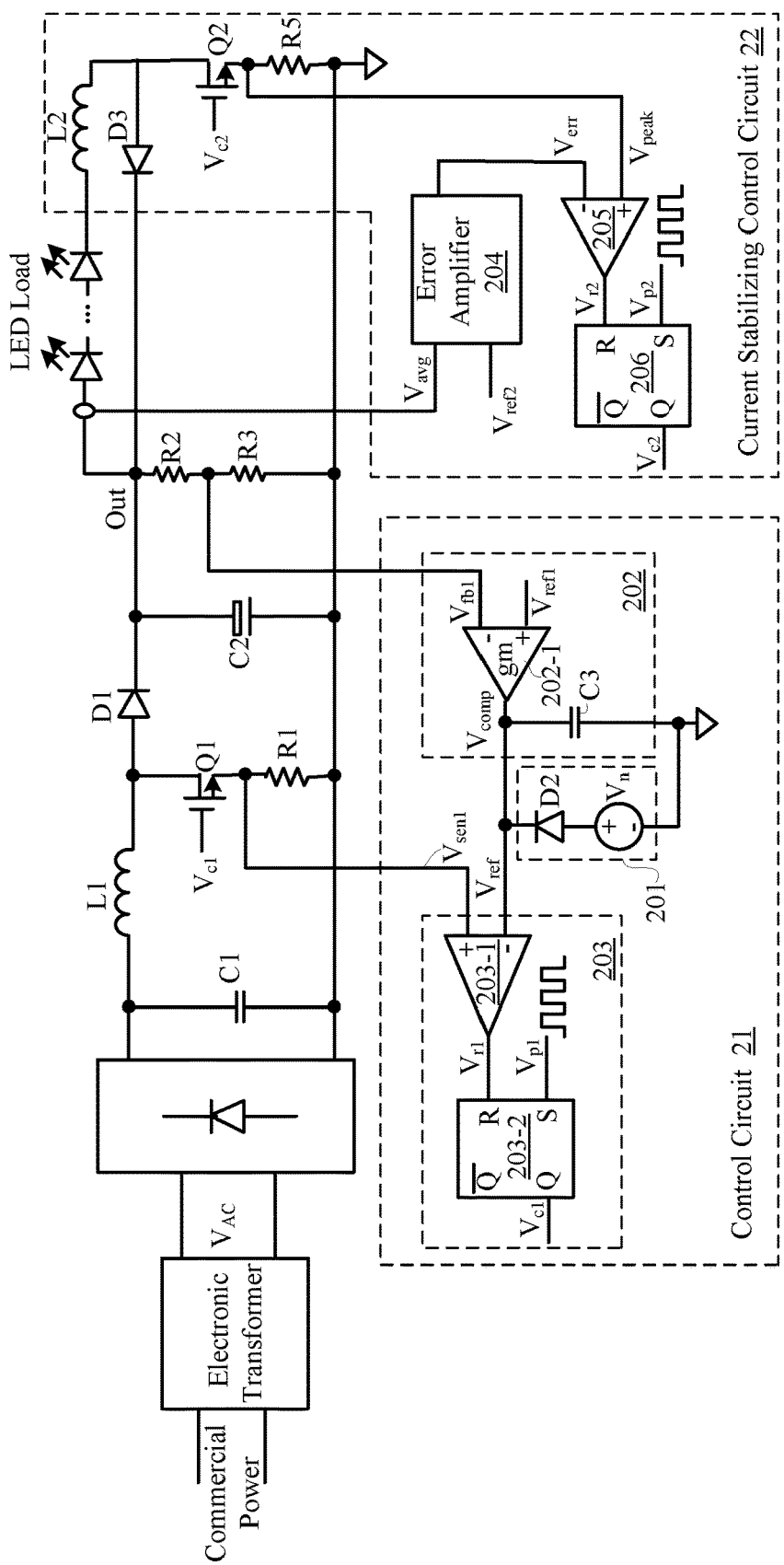
FIG. 2 shows a schematic diagram of a first example LED driver adapted to an electronic transformer in accordance with embodiments of the present invention.

Referring now to FIG. 2, shown is a schematic diagram of a first example LED driver adapted to an electronic transformer, in accordance with embodiments of the present invention. In this particular example, the LED driver can include a rectifier bridge and a power stage circuit that can connect between an electronic transformer and an LED load. The power stage circuit can include inductor L1 and power switch Q1. Inductor L1 can connect to the rectifier bridge, and filter capacitor C1 can connect to output terminals of the rectifier bridge to filter high-frequency harmonic components of the output voltage of the rectifier bridge. For example, filter capacitor C1 can be any suitable capacitor type (e.g., ceramic capacitor, film capacitor, polypropylene capacitor, etc.) with a relatively low capacitance to avoid relatively large impulse currents.

As shown in the example of FIG. 2, the power stage circuit can also include rectifier diode D1, output capacitor C2, and dividing resistors R2 and R3. The power stage circuit in this example can be used to boost voltage for the follow-on circuits. According to FIG. 2, those skilled in the art will recognize that the load current of the electronic transformer can represent the inductor current.

The LED driver can also include control circuit 21 and current stabilizing control circuit 22. In this example, control circuit 21 can adjust the current of inductor L1 by controlling a duty cycle of power switch Q1, through which the load current of the electronic transformer can meet minimum load current requirements, and the output voltage of the power stage circuit can be maintained as substantial constant. Current stabilizing control circuit 22 can be used to keep the LED load current substantially constant. Example circuit structure and operation of control circuit 21 and current stabilizing control circuit 22 will be described in more detail below.

Control circuit 21 can include inductor current clamping circuit 201, voltage control circuit 202, and current control loop 203. Voltage control circuit 202 can include transconductance amplifier 202-1 and a compensation circuit, such as compensation capacitor C3. The inverting input terminal of transconductance amplifier 202-1 can receive voltage feedback signal $V_{fb1}$ that represents an output voltage of the power stage circuit. The non-inverting input terminal of transconductance amplifier 202-1 can receive reference voltage signal $V_{ref1}$, and the output signal of transconductance amplifier 202-1 can be used to generate voltage control signal $V_{comp}$ after being compensated by the compensation circuit.

Inductor current clamping circuit 201 in this example can include diode D2 and voltage source $V_n$. The cathode of diode D2 can connect to compensation capacitor C3, the anode of diode D2 can connect to voltage source $V_n$, and the other terminal of voltage source $V_n$ can connect to ground. Inductor current clamping circuit 201 may have a clamping voltage that matches a holding current of the electronic transformer. For example, the clamping voltage can be $V_n - V_{th}$, where $V_{th}$ can be the conduction voltage drop of diode D2. Inductor current clamping circuit 201 can receive voltage control signal $V_{comp}$. When voltage control signal $V_{comp}$ is less than the clamping voltage, inductor current clamping circuit 201 can clamp voltage control signal $V_{comp}$ to the clamping voltage, and the clamping voltage can be transferred to current control loop 203 as reference voltage $V_{ref}$.

When voltage control signal $V_{comp}$ is larger than the clamping voltage, voltage control signal $V_{comp}$ can be transferred to the current control loop 203 as reference voltage $V_{ref}$. What should be noted here is that voltage source $V_n$ can be set according to the minimum load current of the electronic transformer. For example, when the minimum load current of the electronic transformer is relatively large, voltage source $V_n$ can be relatively large to ensure the inductor current to be no less than the minimum load current of the electronic transformer, and vice versa. Therefore, the clamping voltage of inductor current clamping circuit 201 can match the holding current of the electronic transformer. Those skilled in the art will recognize that the particular implementation of inductor current clamping circuit 201 may not be limited to the example shown, and any suitable clamping circuit can also be applied in the LED driver of particular embodiments.

Current control loop 203 can include comparator 203-1 and flip-flop 203-2. The inverting input terminal of comparator 203-1 can receive reference voltage signal $V_{ref}$, and the non-inverting input terminal of comparator 203-1 can receive sense signal $V_{sen1}$ that represents the inductor current. Comparator 203-1 can generate comparison signal $V_{r1}$ after comparing reference voltage signal $V_{ref}$ against sense signal $V_{sen1}$. Flip-flop 203-2 can receive comparison signal $V_{r1}$ at its reset terminal, and clock signal $V_{p1}$ at its set terminal, and may generate control signal $V_{c1}$. For example, clock signal $V_{p1}$ can be a pulse signal with fixed frequency, and control signal $V_{c1}$ can be used to control power switch $Q_1$. In this way, the inductor current can be adjusted.

When clock signal $V_{p1}$ changes to a high level, flip-flop 203-2 can output control signal $V_{c1}$ at its output terminal Q as a high level state. Control signal $V_{c1}$ can turn on power switch Q1 to increase the current of inductor L1. Then, the inductor current can rise at a certain slope rate. When sense signal $V_{sen1}$ increases beyond reference voltage $V_{ref}$, comparison signal $V_{r1}$ output by comparator 203-1 can change to a high level at the reset terminal of flip-flop 203-2. Thus, control signal $V_{c1}$ output at terminal Q of flip-flop 203-2 can be changed to be low level. Also, power switch Q1 can be turned off by the control signal $V_{c1}$ to reduce the current of inductor L1. By this cycle, the inductor current can be controlled.

For example, current stabilizing control circuit 22 can include error amplifier 204, comparator 205, flip-flop 206, inductor L2, and power switch Q2. Inductor L2 and power switch Q2 can be series connected between the LED load and ground. In addition, current stabilizing control circuit 22 can also include freewheel diode D3 and resistor R5. Error amplifier 204 can receive a detection signal that represents the LED load current, and reference voltage $V_{ref2}$. Specifically, the detection signal in this example can be average voltage signal $V_{avg}$ that represents the average value of the LED load current.

Error amplifying signal $V_{err}$ can be output by error amplifier 204 based on average voltage signal $V_{avg}$ and reference voltage $V_{ref2}$. Comparator 205 can receive error amplifying signal $V_{err}$ at its inverting input terminal, and a sense signal (e.g., peak voltage signal $V_{peak}$ that represents the peak current of inductor L2 current) at its non-inverting input terminal. Comparator 205 may generate comparison signal $V_{r2}$. When peak voltage signal $V_{peak}$ reaches a level of error amplifying signal $V_{err}$, comparison signal $V_{r2}$ may go high. Because the reset terminal of flip-flop 206 can receive comparison signal $V_{r2}$, control signal $V_{c2}$ can be generated to turn off power switch Q2.

The set terminal of flip-flop 206 can receive clock signal $V_{p2}$. For example, clock signal $V_{p2}$ can be a pulse signal with fixed frequency. When clock signal $V_{p2}$ is high, flip-flop 206 can generate control signal $V_{c2}$ to turn on power switch Q2. By this cycle, the LED load current can be controlled substantially constant.

According to the example operation above, a control scheme of particular embodiments can adjust a reference voltage signal through an inductor current clamping circuit, and the voltage control circuit under conditions when LED loads may require different driving power supplies. On the one hand, when a required driving power supply of the LED load is relatively large, the reference voltage can be relatively high so as to make the inductor current large enough to satisfy the requirements of normal operation of the LED loads.

On the other hand, when the required driving power supply is relatively low, the reference voltage can be held at a predetermined value to ensure that the inductor current can meet the minimum load current requirement of the electronic transformer, so as to make sure that the electronic transformer can avoid flicker of the LED load. In this way, the electronic transformer and LED load can be well matched under various circumstances by the control circuit of particular embodiments. Also, the current stabilizing control circuit of particular embodiments can respond to LED load current changes relatively quickly, and can maintain the LED load current as substantially constant. The current stabilizing control circuit can take advantage of relatively high control accuracy and relatively fast response speeds, as compared to conventional approaches.

Figure 3:
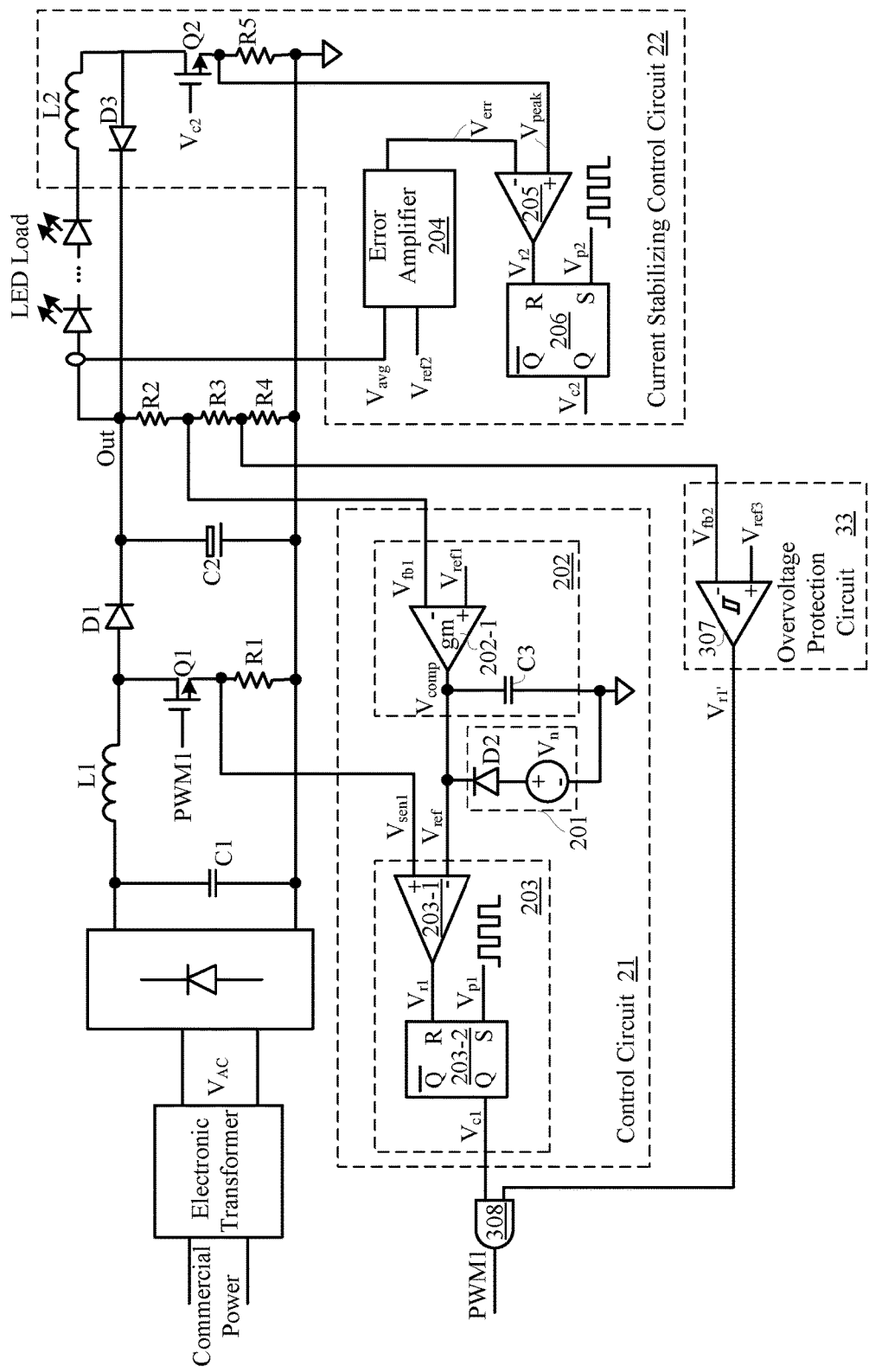
FIG. 3 shows a schematic diagram of a second example LED driver adapted to an electronic transformer in accordance with embodiments of the present invention.

Referring now to FIG. 3, shown is a schematic diagram of a second example LED driver adapted to an electronic transformer, in accordance with embodiments of the present invention. As compared with the example shown in FIG. 2, the particular example of FIG. 3 can include overvoltage protection circuit 33. Overvoltage protection circuit 33 can be used to maintain the output voltage of the power stage as substantially constant, so as to provide a substantially stable voltage source for current stabilizing control circuit 22.

For example, overvoltage protection circuit 33 can include hysteresis comparator 307, where the inverting input terminal can receive voltage feedback signal $V_{fb2}$ that represents the output voltage of the power stage circuit. The non-inverting input terminal of hysteresis comparator 307 can receive reference voltage signal $V_{ref3}$, and hysteresis comparator 307 can output hysteresis comparison signal $V_{r1'}$. Hysteresis comparison signal $V_{r1'}$ and control signal $V_{c1}$ can be used to generate pulse-width modulation (PWM) control signal PWM1 to control power switch Q1 through the logic operation of AND-gate 308.

When voltage feedback signal $V_{fb2}$ is higher than upper threshold voltage $V_{H1}$ of hysteresis comparator 307, hysteresis comparison signal $V_{r1'}$ can be low. Also, AND-gate 308 can generate PWM control signal PWM1 to maintain power switch Q1 in an off state. As a result, the output voltage may decrease gradually. When voltage feedback signal $V_{fb2}$ is decreased to the lower threshold voltage $V_{L1}$ of hysteresis comparator 307, hysteresis comparison signal $V_{r1'}$ can go high. Also, AND-gate 308 can generate PWM control signal PWM1 to control power switch Q1 according to control signal $V_{c1}$. Thus, the output voltage may increase gradually until voltage feedback signal $V_{fb2}$ reaches a level of the upper threshold voltage $V_{H1}$ of hysteresis comparator 307. By repeating the operation cycle, the output voltage ripple of the power stage can be relatively small, and the output voltage can be substantially constant to ensure good operation stability and reliability of the follow-on current stabilizing control circuit.

By applying the above-described LED driver adapted to an electronic transformer in accordance with particular embodiments, the following features can be achieved. For example, the control circuit can ensure that the load current of the electronic transformer is no lower than a required minimum load current. This can ensure that the electronic transformer functions in a normal operating state. Also, the current stabilizing control circuit can be used to maintain the LED load current as substantially constant. In addition, the overvoltage protection circuit can decrease the output voltage ripple of the power stage, so as to provide a substantially constant voltage source for the follow-on stage circuit.

Figure 4:
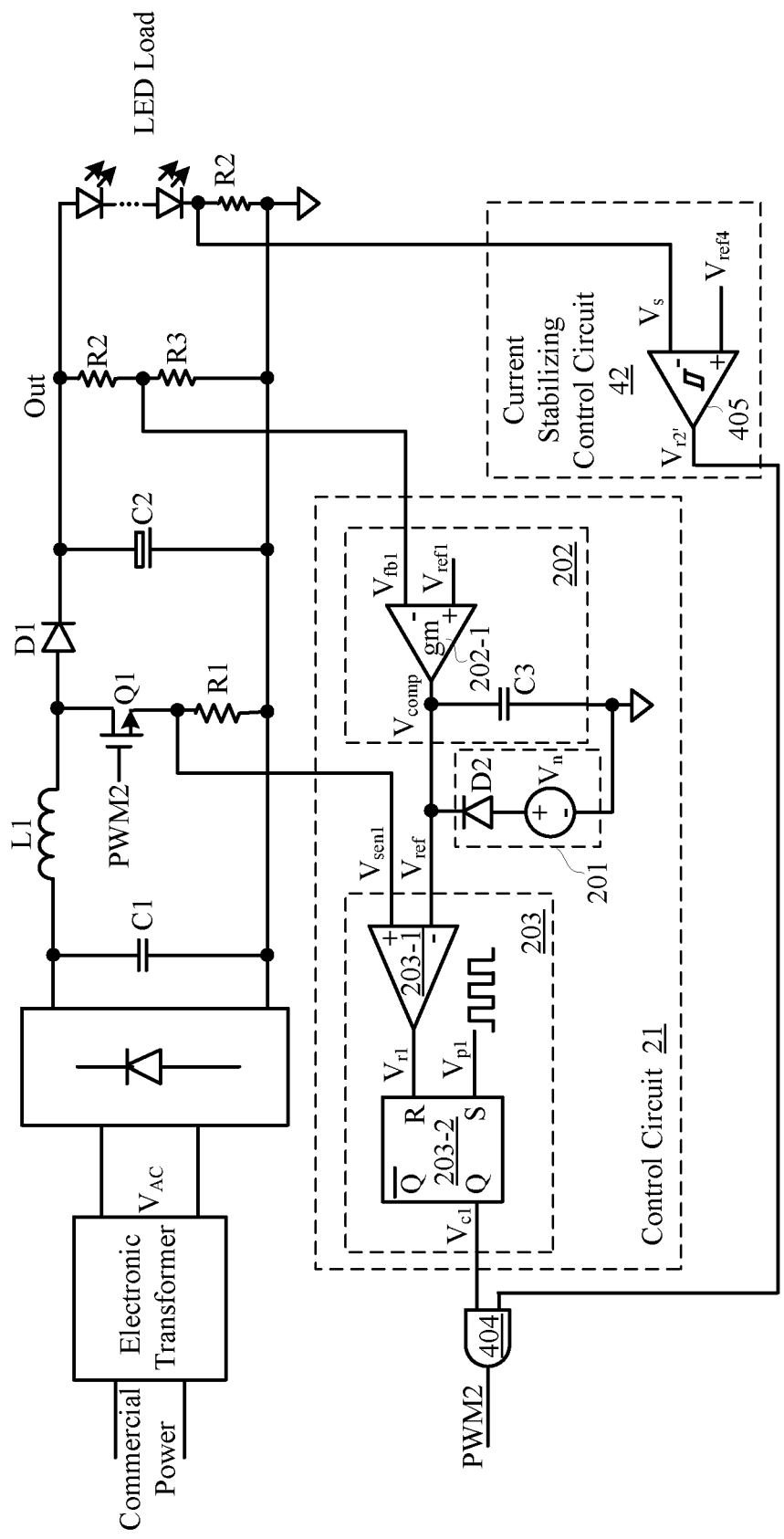
FIG. 4 shows a schematic diagram of a third example LED driver adapted to an electronic transformer in accordance with embodiments of the present invention.

Referring now to FIG. 4, shown is a schematic diagram of a third example LED driver adapted to an electronic transformer, in accordance with embodiments of the present invention. A difference in this example as compared to those described above involves current stabilizing control circuit 42. For example, current stabilizing control circuit 42 can include hysteresis comparator 405. The inverting input terminal of hysteresis comparator 405 can receive detection signal $V_s$ that represents the LED load current. The non-inverting input terminal of hysteresis comparator 405 can receive reference voltage signal $V_{ref4}$, and can generate hysteresis comparison signal $V_{r2}$. Hysteresis comparison signal $V_{r2}$, and control signal $V_{c1}$ can be used to generate PWM control signal PWM2 to control power switch Q1 through the logic operation of AND-gate 404.

Based on the operation principle of the hysteresis comparator, when detection signal $V_s$ is less than upper threshold voltage $V_{H2}$ of hysteresis comparator 405, hysteresis comparison signal $V_{r2}$, can be high. Also, AND-gate 404 can generate PWM control signal PWM2 to control power switch Q1 based on control signal $V_{c1}$, and capacitor C2 can be charged to increase the output voltage. Consequently, the LED current may gradually increase. When detection signal $V_s$ reaches a level of upper threshold voltage $V_{H2}$ of hysteresis comparator 405, hysteresis comparison signal $V_{r2'}$ may go low. Then, AND-gate 404 can generate PWM control signal PWM2 to turn off power switch Q1. Capacitor C2 can supply power for the LED load, and the LED load current may gradually decrease.

When detection signal $V_s$ decreases to a level of lower threshold voltage $V_L$ of hysteresis comparator 405, hysteresis comparison signal $V_{r2}$, may go higher to turn on power switch Q1, so as to gradually increase the LED current. By repeating this cycle, the LED load current ripple can be controlled to be within a relatively small range, and the LED load current can be maintained as substantially constant.

The example LED driver shown in FIG. 4 can adapt to operating requirements of an electronic transformer by adjusting the current of inductor L1 through the control circuitry (e.g., control circuit 21 and current stabilizing control circuit 42). Also, the structure and control logic of the current stabilizing control circuit can be relatively simple so as to be utilized in applications that require relatively low load accuracy, and may also offer lower associated product costs.

An LED driver adapted to an electronic transformer in particular embodiments can adjust the electronic transformer load current by control circuitry to ensure the electronic transformer operates normally. In this way, LED loads can meet requirements of different applications, and the LED loads can match well with electronic transformers to avoid light flicking scene in traditional circuits. Also, the overvoltage protection circuit in particular embodiments can provide a DC voltage source with relatively low voltage ripple for the follow-on current stabilizing control circuit. The current stabilizing control circuit in particular embodiments can satisfy requirements (e.g., high accuracy, low product cost, etc.) of different applications to ensure suitable operation of various LED loads. In addition, particular embodiments can achieve relatively small ripple without utilizing a large electrolytic capacitor after the rectifier bridge.

In particular embodiments, circuit structures and components of the voltage control circuit, current control loop, inductor current clamping circuit, current stabilizing control circuit, and so on, are not limited to the examples shown and discussed above. Any suitable circuit with a same or similar function can be utilized in particular embodiments. In addition, the power stage circuit can also be other suitable topology structures or converter types (e.g., single-ended primary-inductor converter [SEPIC], etc.).

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A light-emitting diode (LED) driver adapted to an electronic transformer, the LED driver comprising:
   a) a rectifier bridge and a power stage circuit coupled between said electronic transformer and an LED load, wherein said power stage circuit comprises an inductor and a power switch;
   b) a first control circuit configured to control said power switch to regulate a current of said inductor, and to generate a voltage control signal that represents an error between an output voltage of said power stage circuit and a reference voltage;
   c) an inductor current clamping circuit in said first control circuit that comprises a voltage source directly connected to ground and coupled to a diode, wherein said inductor current clamping circuit is configured to regulate said inductor current by controlling a duty cycle of said power switch to maintain a load current of said electronic transformer to be no less than a holding current of said electronic transformer, wherein said inductor current clamping circuit is configured to provide a clamping voltage that is a conduction voltage drop of said diode less than said voltage source and matches said holding current; and
   d) wherein said clamping voltage is provided to a current control loop as a reference voltage signal when said voltage control signal is less than said clamping voltage, and said voltage control signal is provided to said current control loop as said reference voltage signal when said voltage control signal is greater than said clamping voltage.

2. The LED driver of claim 1, wherein:
   a) a voltage control circuit is configured to generate said voltage control signal based on said output voltage of said power stage circuit and said reference voltage; and
   b) said current control loop is configured to receive a first sense signal that represents said inductor current and said reference voltage signal, and to generate a first control signal to control said power switch.

3. The LED driver of claim 2, wherein said voltage control circuit comprises:
   a) a first transconductance amplifier configured to receive said first voltage feedback signal and said first reference voltage signal; and b) a compensation circuit configured to receive an output from said first transconductance amplifier, and to generate said voltage control signal.

4. The LED driver of claim 2, wherein said current control loop comprises:
   a) a first comparator configured to receive said first sense signal and said reference voltage signal, and to generate a first comparison signal; and
   b) a first flip-flop configured to receive said first comparison signal at a reset terminal and a first clock signal at a set terminal, and to generate said first control signal to control said power switch.

5. The LED driver of claim 1, wherein said LED driver further comprises:
   a) an overvoltage protection circuit having a first hysteresis comparator configured to receive a second voltage feedback signal and a third reference voltage signal, and to generate a first hysteresis comparison signal, wherein said second voltage feedback signal represents an output voltage of said power stage circuit; and
   b) a first AND-gate configured to receive said first hysteresis comparison signal and a first control signal from said first control circuit, and to generate a first pulse-width modulation (PWM) control signal to control said power switch.

6. The LED driver of claim 1, further comprising a filter capacitor coupled in parallel connected to output terminals of said rectifier bridge, wherein said filter capacitor is configured to filter high-frequency harmonic components of an output voltage of said rectifier bridge.

7. The LED driver of claim 1, wherein said first control circuit is configured to control said power switch to regulate said inductor current to maintain an output voltage of said power stage circuit as substantially constant.

8. The LED driver of claim 1, wherein said LED driver further comprises a current stabilizing control circuit configured to maintain said LED load current as substantially constant based on a detection signal that represents a current of said LED load.

9. The LED driver of claim 8, wherein said current stabilizing control circuit comprises:
   a) a second inductor and a second power switch coupled between said LED load and ground;
   b) an error amplifier circuit configured to receive said detection circuit and a second reference voltage signal, and to generate a first error amplifying signal;
   c) a second comparator configured to receive said first error amplifying signal and said second sense signal, and to generate a second comparator signal, wherein said second sense signal represents a second inductor current; and
   d) a second flip-flop configured to receive said second comparison signal at a reset terminal and a second clock signal at a set terminal, and to generate a second control signal to control said second power switch.

10. The LED driver of claim 8, wherein said current stabilizing control circuit comprises:
    a) a second hysteresis comparator configured to receive said detection signal and a fourth reference voltage signal, and to generate a second hysteresis comparison signal; and
    b) a second AND-gate configured to receive said second hysteresis comparison signal and a first control signal from said first control circuit, and to generate a second PWM control signal to control said power switch.

11. A method of controlling a light-emitting diode (LED) driver adapted to an electronic transformer, the LED driver comprising a rectifier bridge and a power stage circuit coupled between said electronic transformer and an LED load, wherein said power stage circuit comprises an inductor and a power switch, the method comprising:
    a) controlling, by a first control circuit, said power switch to regulate a current of said inductor;
    b) generating a voltage control signal that represents an error between an output voltage of said power stage circuit and a reference voltage;
    c) regulating, by an inductor current clamping circuit in said first control circuit that comprises a voltage source directly connected to ground and coupled to a diode, said inductor current by controlling a duty cycle of said power switch to maintain a load current of said electronic transformer to be no less than a holding current of said electronic transformer;
    d) providing a clamping voltage that is a conduction voltage drop of said diode less than said voltage source and matches said holding current to a current control loop as a reference voltage signal when said voltage control signal is less than said clamping voltage; and
    e) providing said voltage control signal to said current control loop as said reference voltage signal when said voltage control signal is greater than said clamping voltage.

12. The method of claim 11, further comprising filtering, by a filter capacitor coupled in parallel connected to output terminals of said rectifier bridge, high-frequency harmonic components of an output voltage of said rectifier bridge.

13. The method of claim 11, further comprising controlling, by said first control circuit, said power switch to regulate said inductor current to maintain said output voltage of said power stage circuit as substantially constant.

14. The method of claim 11, further comprising:
    a) generating, by a voltage control circuit, said voltage control signal based on said output voltage of said power stage circuit and said reference voltage; and
    b) generating, by said current control loop configured to receive a first sense signal that represents said inductor current and said reference voltage signal, a first control signal to control said power switch.

* * * * *